US010713143B1

United States Patent
Vemulapati et al.

(10) Patent No.: US 10,713,143 B1
(45) Date of Patent: Jul. 14, 2020

(54) CALIBRATABLE LOG PROJECTION AND ERROR REMEDIATION SYSTEM

(71) Applicant: Accenture Global Solutions Limited, Dublin (IE)

(72) Inventors: Jayanti Vemulapati, Hyderabad (IN); Lisa Suzanne Wilson, Chicago, IL (US); Murtuza Chitalwala, Mumbai (IN); Chethana Savalgi, Bangalore (IN); Sekhar A. Badugu, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/449,644

(22) Filed: Jun. 24, 2019

(51) Int. Cl.
*G06F 11/34* (2006.01)
*G06N 20/00* (2019.01)
*G06F 9/50* (2006.01)
*G06F 9/455* (2018.01)

(52) U.S. Cl.
CPC ...... *G06F 11/3476* (2013.01); *G06F 9/45558* (2013.01); *G06F 9/5016* (2013.01); *G06F 9/5055* (2013.01); *G06F 11/3447* (2013.01); *G06N 20/00* (2019.01); *G06F 2009/4557* (2013.01)

(58) Field of Classification Search
CPC ............ G06F 11/3476; G06F 9/45558; G06F 9/5055; G06F 11/3447; G06F 2009/4557; G06F 9/5016; G06N 20/00
USPC ........................................................ 717/128
See application file for complete search history.

(56) References Cited

U.S. PATENT DOCUMENTS

| 10,102,056 | B1 * | 10/2018 | Goldberg | G06F 11/079 |
| 2016/0028599 | A1 * | 1/2016 | Vasseur | H04L 41/16 |
| | | | | 370/252 |
| 2018/0107941 | A1 * | 4/2018 | Siebel | G01R 21/00 |
| 2019/0095245 | A1 * | 3/2019 | Abes | G06F 9/505 |
| 2019/0102693 | A1 * | 4/2019 | Yates | G06N 5/003 |

(Continued)

OTHER PUBLICATIONS

Taghavi et al, "Compute Job Memory Recommender System Using Machine Learning", [Online], 2016, pp. 609-616, [Retrieved from internet on May 15, 2020], <https://dl.acm.org/doi/pdf/10.1145/2939672.2939717> (Year: 2016).*

(Continued)

*Primary Examiner* — Geoffrey R St Leger
*Assistant Examiner* — Zengpu Wei
(74) *Attorney, Agent, or Firm* — Brinks Gilson & Lione

(57) ABSTRACT

A system access a session profile. The session profile may include log source identifiers and model identifiers. The system may deploy a log projection session based on the session profile. The system may receive, in response to deployment of the log projection session, a log stream from a log source corresponding to at least one of the log identifiers. The system may generate a log projection stream based on the log stream and an initial machine-learning model. The system may calibrate the session profile and select an alternative machine-learning model based on model performance metrics. The system may redeploy the log projection session based on the calibrated session profile. The system may automatically scale computer resources for improved job performance based on forecasted log information derived from the selected machine-learning model.

22 Claims, 7 Drawing Sheets

(56) References Cited

U.S. PATENT DOCUMENTS

2019/0130327 A1* 5/2019 Carpenter ............... H04L 43/08
2019/0196421 A1* 6/2019 Littlefield .......... G06Q 10/0639

OTHER PUBLICATIONS

Murali et al, "Machine Learning Approaches for Resource Allocation in the Cloud: Critical Reflections", [Online], 2018, pp. 2073-2079, [Retrieved from internet on May 15, 2020], <https://ieeexplore.ieee.org/stamp/stamp.jsp?tp=&arnumber=8554703> (Year: 2018).*
Marti'nez et al, "Dynamic Multicore Resource Management: A Machine Learning Approach", [Online], 2009, pp. 8-17, [Retrieved from internet on May 15, 2020], <https://ieeexplore.ieee.org/stamp/stamp.jsp?tp=&arnumber=5325152> (Year: 2009).*

* cited by examiner

US 10,713,143 B1

CALIBRATABLE LOG PROJECTION AND ERROR REMEDIATION SYSTEM

TECHNICAL FIELD

This disclosure relates to machine-learning and cloud computing and, in particular to, machine-learning performance and computer resource calibration.

BACKGROUND

Rapid advances in communications and storage technologies, driven by immense customer demand, have resulted in widespread adoption of cloud systems for managing large data payloads, distributed computing, and record systems. Such systems generate logic quantities of log information. Responsively responding to the log information to prevent errors and perform right-sizing of computer resources is impractical under conventional approaches, particularly approaches involving human intervention.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
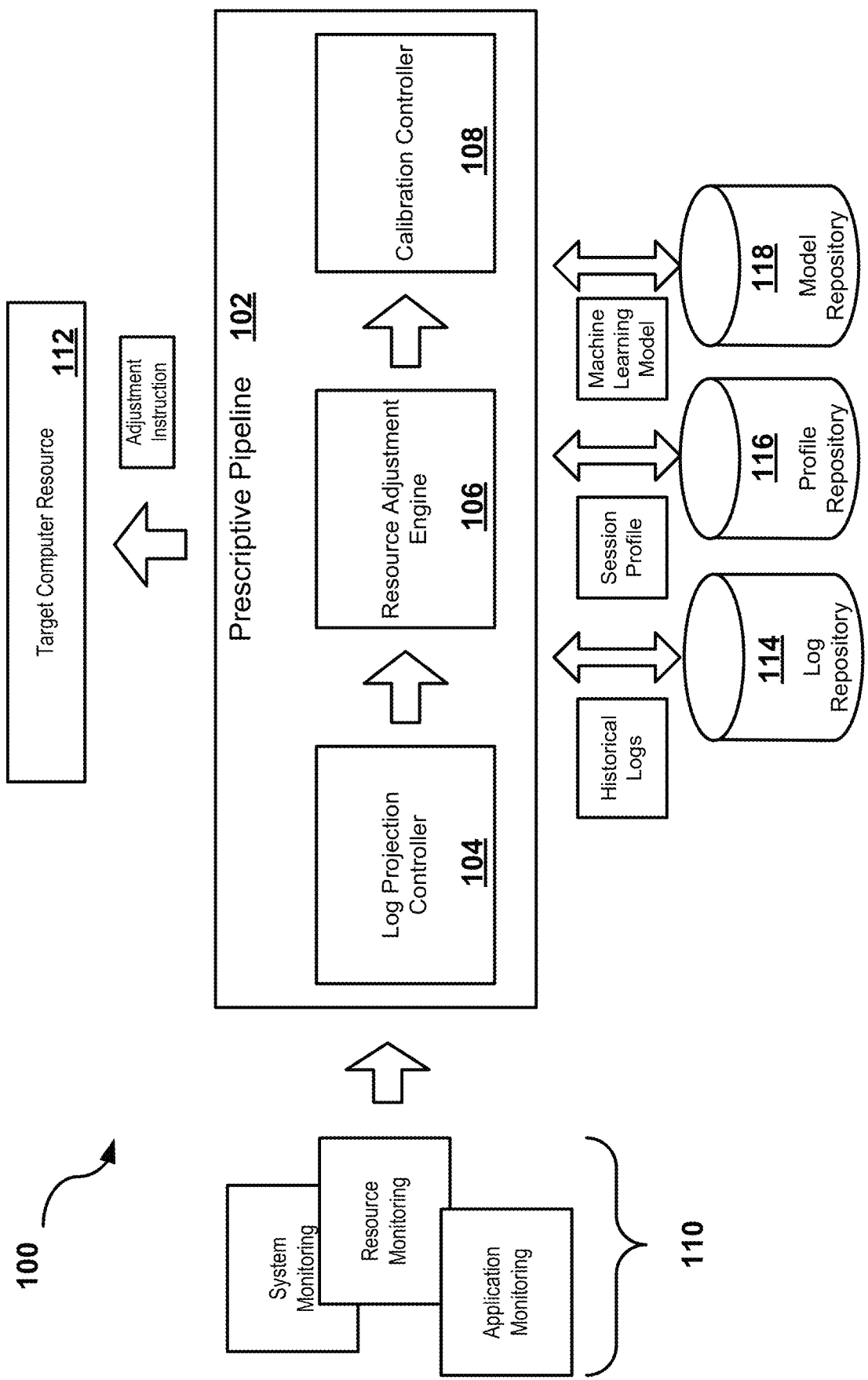
FIG. 1 illustrates an example of a system.

Computing environments, such as cloud computing or on-premises environments, may include numerous computer resources. The computer resources, or monitoring agents for the computer resources, may generate large amounts of log information. Conventional computer management approaches fail to forecast computer operation and proactively initiate operational adjustments or computer resource allocation to prevent adverse computer resource operation. While machine-learning provides predictive capabilities, machine-learning may be subject to inefficiencies and/or inaccuracies, particularly when large quantities of data are available. Moreover, the quality and source of the log data may change over time, and some machine-learning models may become obsolete.

The system and methods described herein provide numerous technical advantages to computer resource management. By way of introductory example, a system may access a session profile. The session profile may include log source identifiers and model identifiers. The model identifiers indicative of machine-learning models. The model identifiers may include an initial model identifier. The initial model identifier may be previously flagged. The system may deploy a log projection session based on the session profile. For example, the system may extract the log source identifiers and the initial model identifier from the session profile. The system may receive a log stream from a log source corresponding to at least one of the extracted log identifiers. The system may generate a log projection stream based on the log stream and an initial machine-learning model corresponding to initial model identifier.

The system may calibrate the session profile. For example, the system may generate, based on application of historical log data to the machine-learning models, respective performance metrics for the machine-learning models. The system may flag an alternative model identifier in response to the alternative model identifier being associated with a greatest one of the respective performance metrics, The system may redeploy the log projection session based on the calibrated session profile. For example, the system may generate the log projection stream based on application of the log stream to the alternative machine-learning model instead of the initial machine-learning model.

An example of a technical advantage achieved by the system and methods described herein is proactive prevention and remediation of errors in a computing environment. For example, forecasted log information may be generated by way of one or more machine-learning model. The forecasted log information may include indicative of abnormal computer resource operation, such as job failures, application failures, hardware, failures, etc., that is expected to occur in the future. The forecasted log information may be evaluated against predetermined criteria, such as adjustment criteria, that is configured to identify faults, generate notifications, and/or determine whether to adjust a computer resource. In some examples, the adjustment of the computer resource may involve instructing a computing platform to allocate a new node, or increasing an amount of computer resources for an existing a node.

Another example of a technical advantage achieved by the system and methods described herein is that the accuracy of the forecasted log information and/or the quality of preventative action may be improved by recalibrating the session profile. For example, a log projection session may generate a log projection stream based on an initial session profile. As the historical log data of a computing environment changes, new machine-learning models become available, or the available of log sources change, the session profile may be updated with new parameters, such as new machine-learning models. The system may redeploy or reconfigure a log session based on the calibrated session profile. Additional or alternative technical advantages are made evident in the system and methods described herein.

FIG. 1 illustrates an example of a system 100. The system may include a prescriptive pipeline 102. The prescriptive pipeline 102 may include a log projection controller 104, a resource adjustment engine 106, and/or a calibration controller 108.

The log projection controller 104 may, among other aspects described herein, establish log projection session(s) based on one or more session profile. The log projection sessions may receive log streams generated by log source(s) 110. The log projection sessions may apply of the logs from the log streams to one or more machine-learning models, as specified by the session profile. In some examples, the session profile may include multiple model identifiers. The session profile may include a priority value, such as a flag, assigned to at least one of the model identifiers. For example, the flag may be indicative of a preferred or active status. The log projection controller 104 may access the machine-learning model flagged with the preferred status or assigned the optimum (highest or lowest) priority value. The log projection controller may generate a log projection stream based on application of log information from the log stream to the flagged machine-learning model. Additional and/or alternative aspects of the log projection controller 104 are described in reference to FIGS. 2 and 3.

The resource adjustment engine 106 may, among other aspects described herein, automatically adjust operation of a target computer resource 112 based on log projections. By adjusting operation of the target computer resource 112, the resource adjustment engine 106 may reallocate computer resources, allocate new computer resources, and/or change operation of one or more computer resource. In some examples, the resource adjustment engine 106 may access a session profile to obtain adjustment criteria and/or adjustment instructions. The adjustment criteria may specify the conditions for when to adjust computer resource operation. The adjustment instruction my specify how to adjust computer resource operation. Additional and/or alternative aspects of the resource adjustment engine 106 are described in reference to FIG. 4.

The calibration controller 108 may, among other aspects described herein, calibrate one or more session profile to improve predictive outcomes, error remediation, and/or computer resource operation. For example, the calibration controller 108 may test the predictive performance of multiple machine-learning models identified by a session profile. The calibration controller 108 may reprioritize and/or reflag the machine-learning models in response to changing performance of the machine-learning models. The performance of the machine-learning models may change in response to introduction of new machine-learning models, removal of machine-learning models, modification of machine-learning models, changes in log source availability, changes in computer resource operation, and/or changes in historical log data. Additional and/or alternative aspects of the log projection controller 104 are described in reference to FIG. 5.

A session profile may include information descriptive of detection, prediction, and/or remediation of operational scenarios involving one or more computer resources. The session profile may include logic, instructions, and/or information to perform detection, prediction, and/or remediation based on the current or predicted behavior of one or more computer resources. An example of a session profile is described in Table 1.

TABLE 1

| | Session Profile | | | | |
|---|---|---|---|---|---|
| Operational Scenario | Predict and remedy high CPU usages leading to job slowness. | | | | |
| Log Source Identifiers | Resource metrics (CLOUD WATCH) | Resource metrics (SAR) | Resource metrics (NAGIOS) | Job metrics (HDP) | Job metrics (TALEND) |
| | Avg_CPU | %iowait PERCENT | UPTIME-failed | No. of jobs | TACUptime |
| | Avg_DiskUtil | %mem AVERAGE | CPU-running | No. of jobs Uptime | TACService |
| | Avg_Network In_bytes | pgfree/s | MEM-AVERAGE used by the cluster | Avg. memory | Jobsfailedto-generate |
| | Avg_Network Out_bytes | pgpgin/s | ROOTDISK-AVERAGE by Yarn | Memory allocated | jobserver service |
| | | pgpgout/s | SUPDISK-AVERAGE | No. of failed jobs in application server | numberof failedjobs | |

| Machine Learning Model | Log Source Identifiers | Log Source | ML Model | FLAG |
|---|---|---|---|---|
| | CPU Utilization | Cloudwatch | ARIMA | 1 |
| | Memory Utilization | SAR | ARIMA | 0 |
| | Disk Utilization | System Command | ARIMA | 0 |
| | Network In | Cloudwatch | ARIMA | 0 |
| | Network Out | Cloudwatch | ARIMA | 0 |
| | Disk Capacity Predicted Date | System Command | LINEAR REGRESSION | 0 |
| | HDP: jobs failed | YARN | ARIMA | 0 |
| | HDP: jobs running | YARN | ARIMA | 0 |
| | HDP: Avg. memory used by the cluster | YARN | LINEAR REGRESSION | 0 |
| | HDP: Memory allocated by Yarn | YARN | LINEAR REGRESSION | 0 |
| | Talend: jobs failed jobs | Talend: JobServer | ARIMA | 0 |

TABLE 1-continued

Session Profile

Operational
Scenario          Predict and remedy high CPU usages leading to job slowness.

Adjustment
Configuration

```
If (Predicted CPU Usage > 75 %)
{
   Re-provision Virtual Host A with 1 additional processor.
{
If(Predicted CPU Usage > 90 %)
{
   Re-provision Virtual Host A with 2 additional processors.
}
```

In some examples, the session profile may include one or more log source identifier. A log source identifier may include information that identifies a source of log data. For example, the log source identifier may include an IP address, a name, a memory address and/or other information that identifies the log source for communication. In some examples, the log source identifier may include a parameter for a location in a data structure for log data, such as a column name in a table, or some other parameter that is associated with the location of the log. In other examples, the log source identifier may include a parameter that identifies information of a type of log data, such as a topic for a message broker or a log type name for an application-programming interface. Alternatively or in addition, the log source identifier may include an identifier of a communication channel or repository.

In some examples, the session profile may include one or more model identifier. A model identifier may include information that identifies a machine-learning model. For example, the model identifier may include the name, a file name, memory location, address, type, and/or any other relevant information for identifying a machine-learning model and/or a location at which a machine-learning model is stored or made available. In some examples, the session profile may include multiple model identifiers. The session profile may include a flag associated with a machine-learning model. The flag may indicate the machine-learning model is the preferred or active machine-learning model. Alternately or in addition, the machine-learning model may prioritize the model identifiers according to a ranking order. The rank may be sequential (i.e. 1, 2, 3, 4 . . . etc.), or confidence based (i.e. 60%, 65%, 80% . . . etc). Under the confidence based approach, each of the model identifiers may be associated with a performance metric that scores the associated machine-learning models in terms of predictive performance (i.e. confidence, accuracy, etc.)

The session profile may include mappings between log source identifiers and model identifiers. Each of the model identifiers may be associated with a separate group of one or more log source identifier. The mappings may identify the log sources that are compatible or relevant to a machine-learning model. For example, a machine-learning model may be configured to make inferences, cluster data, and/or perform classification based on a particular set of input parameters. The input parameters of the machine-learning model may include log information from the log sources mapped to the model identifiers. Thus, reflagging the preferred machine-learning model may additionally constitute reflagging the preferred log source identifiers for the log sources that provide data for the machine preferred learning model.

In some examples, the session profile may include (or be associated with) an adjustment configuration. The adjustment configuration may specify when and how to adjust operation one or more computer resource. Alternately or in addition, the adjustment configuration may identify the one or more computer resources to adjust and identifiers, addresses, credentials, and/or other information to communicate with one or more computer resource.

The adjustment configuration may include adjustment criteria. The adjustment criteria may include thresholds, conditional logic, and/or other logic that compares the logs with predetermined information to determine whether to perform an adjustment of a computer resource. For example, the adjustment criteria may include logic to compare projected log data with one or more thresholds.

The adjustment configuration may include an adjustment instruction. The adjustment instruction may include an instruction, such as an executable instruction to scale a computer resource and/or computer resources. For example, the adjustment may include a request to reallocate or newly allocate the number of processors, random-accessed memory, network resources, storage memory, and/or other computer resources and/or virtual machines. In other examples, the adjustment instruction may include an instruction to cause a job to start, stop, resume, and/or terminate operation of a job. Alternatively or in addition, the adjustment instruction may cause a job to change operational behavior by communicating parameters to the job or a controller of the job.

By way of example, the adjustment instruction may include an instruction executable by the target computer resource 112. The adjustment instruction may cause the target computer resource 112 to allocate additional or new computer resource(s) to a job, application, or other set of executing logic. For example, the adjustment instruction may include an instruction allocate or start a new virtual node that executes the job. In other examples, the adjustment instruction may cause a job to be moved to or from the target computer resource. For example, the adjustment instruction may include an instruction to unprovision a job on a previous computer resource and provision the job on the target computer resource.

The target computer resource 112 may include a computer environment, components of a computer and/or one or more computer nodes. For example, the target computer resource 112 may include physical or virtual computer node. The target computer resource may allocate computer resources such as memory, processors, operation systems, virtual machines and/or other hardware or software components. In some examples, the target computer resource 112 may allocate computer resources for execution of an application or job.

A job may include an identifiable unit of execution to perform a task or multiple tasks. For example, a job may perform functionality under an application. The job may be associated with various states indicative of the progress of a job (i.e. start, stop, paused, etc). The job may be scheduled to begin, or periodically begin execution. Alternately or in addition, the job execute in response to a satisfaction of a start condition. By way of example, a job may include a Spark ML job running in Cloudera application, database, an Impala OLAP job running under Cloudera application, scheduled JOBs running in a database management system, and/or any other example of identifiable units of execution The log source 110 may include a source of log information. In various implementations, the system may include a log source, or multiple log sources. By way of example, a log source may include a monitoring platform, such as NAGIOS, CLOUD WATCH, or some other application or suite with logging capabilities. Alternatively or in addition, the log source may include an operating system, an application, a cloud-provider, a communication channel, a storage, and/or any other computer resource that generates, communicates, and/or stores log information. The log source may provide log data in response to receiving requests for log data. Alternatively or in addition, the log source may push a log to a receiver in response to detecting or generating the log. By way of example, the log source may provide logs descriptive of the target computer resources 112, operation of jobs and/or applications executing on the target computer resource 112, and/or any combination thereof.

A machine-learning model may include a data set and/or set of operations generated by a machine-learning framework. The machine-learning model may project, by modifying the input information with linear algebra operations, statistical formulas, and/or other mathematical operations, to generate projected information. The machine-learning framework may include a framework for generating associations between information. The machine-learning framework may include supervised, semi-supervised, and/or unsupervised approaches to data association. Depending on the input data and/or the predictive objective, some machine-learning models may be more relevant than others. By way of non-limiting examples, the machine-learning models applicable to log projection may include linear regression, logistic, support vector machine, random forest, K-means, Naïve Bayes, and/or models based on other approaches.

A log, as defined herein, is a unit of information that is descriptive of operation of a computer resource. For example, a log may include a log message indicative of an error, a warning, operational information, and/or other operational status. Alternatively or in addition, the log may include a utilization metric or metrics. The utilization metric may include a measure computer resource utilization (e.g. cpu utilization, memory utilization, number of threads, number of processes, latency, bandwidth, and/or other metrics that measure computer resource utilization). In some examples, the log may include (or be associated with) with a time stamp. The time stamp may include a past or future time for when the log was (or will be) generated.

In various embodiments, a log may be associated with a job. Accordingly, a log may include computer resource utilization metrics associated with the job (i.e. the quantity of computer resources accessed by a job). Alternately or in addition, a log may include information generated by the job or by log sources that are monitoring the job.

A communication channel is defined, herein, as a pathway of communication between computer resources. For example, the communication channel may include a connection-based or connection-less endpoint, such as an internet-protocol based address/port combination, a message broker, a publish/subscribe session, an inter-process communication, an in-memory messaging cache, a repository, and/or any other endpoint or storage where the latest log information from a log source is stored, retrieved and/or exchanged.

In some examples, the system may include a log repository 114. The log repository 114 may store logs. The log repository 114 may include a storage, such as memory locations, a database, a cloud storage, or some other suitable storage, that stores logs. The prescriptive pipeline 102 may receive logs from the log repository 114. In some examples, the log repository 114 may include a cache for log streams. Accordingly, the log repository 114 may store real-time log information in cache data structures including, for example, a first-in-first-out queue or other suitable data structure. In some examples, the log may be associated with a job, application, server, node and/or other computer resource. By way of example, the log repository may include a mapping between a job and logs that are generated during operation of the job.

The prescriptive pipeline 102 may receive historical logs. For example, the prescriptive pipeline 102 may receive the historical logs from the log repository 114. The historical logs may include logs that are previously generated by one or more log source. For example, the historical logs may include logs that are older than a time threshold, such as a time value in the range of days, weeks, months, and/or years from generation.

The system may further include a profile repository 116. The profile repository 116 may include a storage, such as memory locations, a database, a cloud storage, or some other suitable storage. The profile repository 116 may store, among other information, a session profile, or multiple session profiles. The session profiles may be associated with identifiers. The model repository may be searchable based on the identifiers.

The system may further include a model repository 118. The model repository 118 may include a storage, such as a memory locations, a database, a cloud storage, or some other suitable storage. The model repository 118 may store, among other information, one or more machine-learning model. The machine-learning models may be associated with model identifiers. The machine-learning models may be searchable based on the machine-learning identifiers.

In some examples, the log repository, the profile repository, and/or the model repository may be included in a database system. Alternatively or in addition, the information stored in each repository may be inter-associated such that searches may be performed to identify data based on their associated relationships. By way of example, a log be associated with a session identifier that identifies the projection session that generated the log. Alternately or in addition, the projection session and/or the log may be associated with a profile identifier, a machine model identifier, and/or an identifier of an adjustment configuration.

Figure 2:
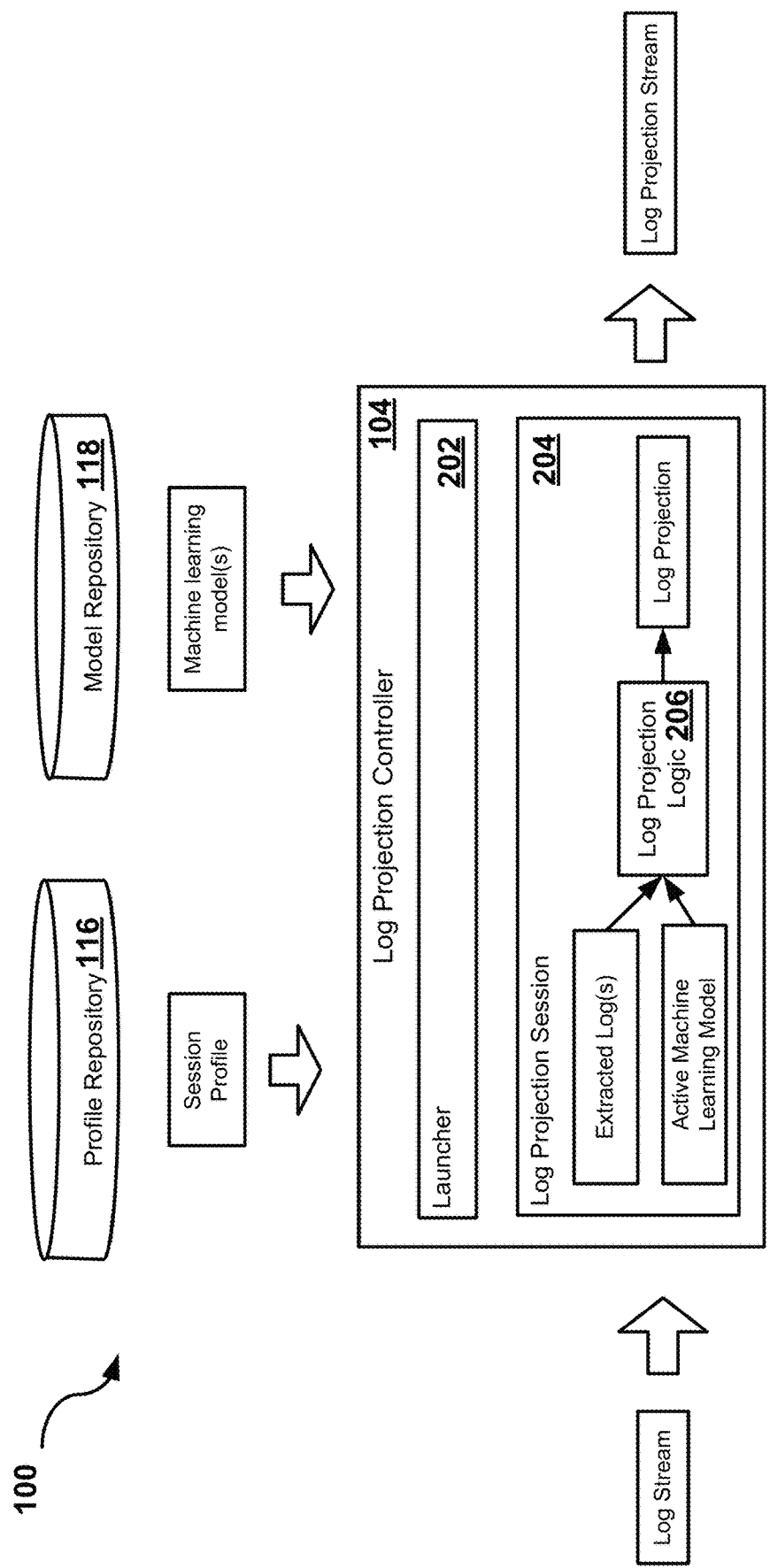
FIG. 2 illustrates an example of a log projection controller.
Figure 3:
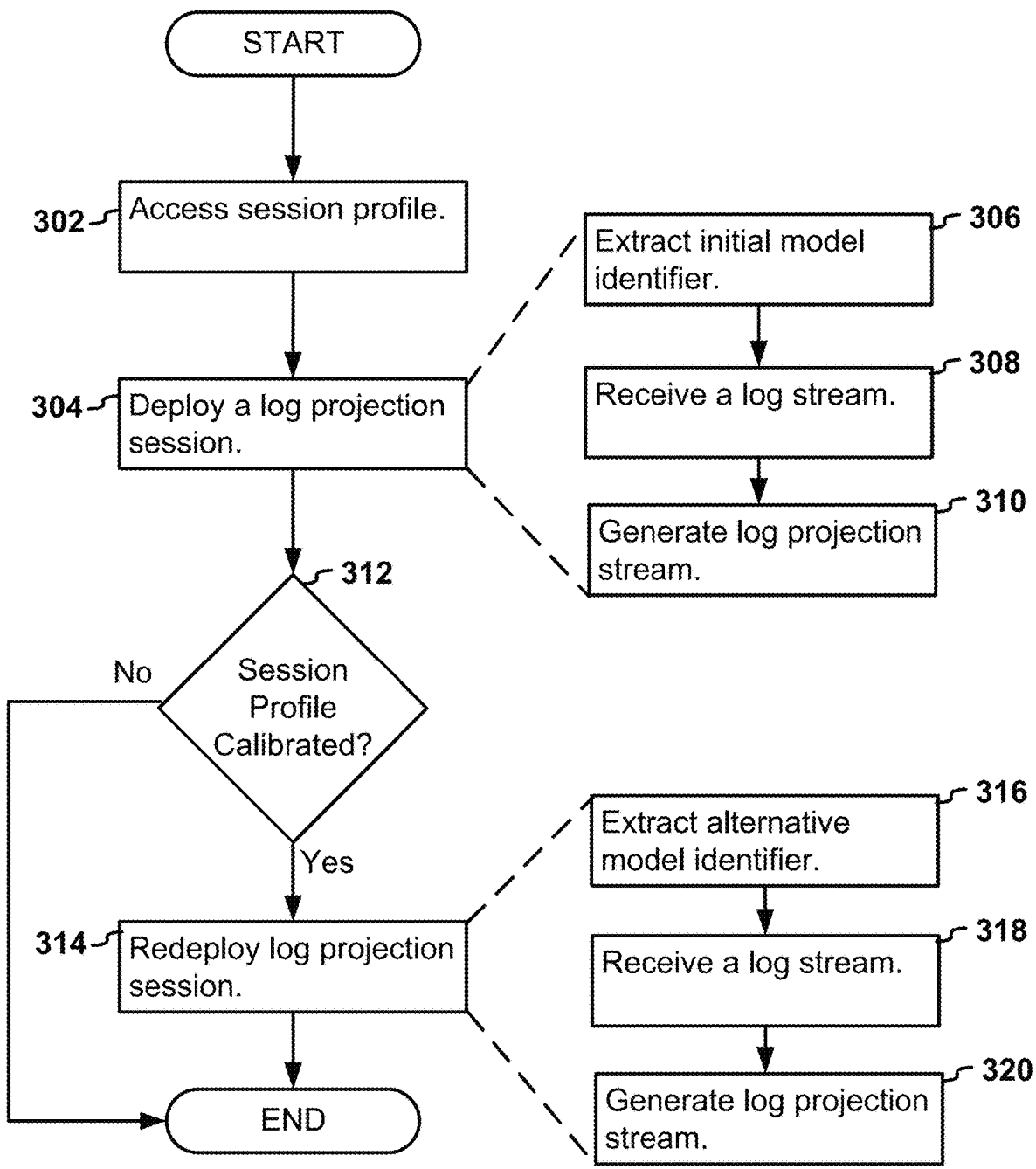
FIG. 3 illustrates an example of a flow diagram for logic for a log projection controller.

FIG. 2 illustrates an example of the log projection controller 104. The log projection controller 104 may include a launcher 202 and a log projection session 204, or multiple log projection sessions. FIG. 3 illustrates an example of a flow diagram for logic for the log projection controller 104. Reference to FIG. 3 is made throughout the following discussion of FIG. 2.

The launcher 202 may access a session profile (302). For example, the launcher 202 may access a session profile from the profile repository 116. In some examples, the launcher 202 may receive an identifier of the session profile. The launcher may access the session profile based on the identifier. Alternately or in addition, the session profile may be communicated to the launcher 202.

The launcher 202 may deploy the log projection session 204 (304). The launcher may deploy the log projection session 204 in a memory for execution on a computing platform. For example, the launcher 202 may generate the log projection session 204 based on the session profile. For example, the log projection session 204 may include a thread, a process, a virtual machine, or some other or identifiable allocation of computer resource(s). In some examples, multiple log projection sessions may be deployed at the same time. Each of the log projection sessions may be deployed based on a separate session profile. The log projection streams generated by each of the log projection sessions may be based on different log streams and/or machine-learning models.

The launcher 202 and/or the log projection session 204 may extract a log source identifier and a model identifier from the session profile (306). For example, the launcher 202 may parse the session profile for one or more log sources and/or one or more model identifier. In some examples, a model identifier of the session profile may be flagged to indicate a preferred model. The launcher 202 may select the flagged model identifier. The flagged model identifier may be associated with a particular group of log source identifiers. The launcher 202 may extract the particular log identifiers from the session profile.

The launcher 202 may configure the log projection session 204 with an active machine-learning model 206. The active machine-learning model may correspond to the model identifier flagged in the session repository. In some examples, the launcher 202 may select the active machine-learning model from the model repository 118. For example, the active machine-learning model may be associated with the model identifier in the model repository 118. In other examples, the machine-learning model may be included in the session profile.

The log projection session 204 may receive a log stream from the log source(s) (308). In some examples, the log projection session 204 may receive the log source identifiers from the launcher 202. In other examples, the log projection session 204 may extract the log source identifiers from the session profile. The log projection session 204 may communicate with log source(s) specified by the log source identifier(s). Alternately or in addition, the launcher 202 may cause the log projection session 204 to receive a log stream (or multiple log streams). Alternatively or in addition, the log projection session 204 may perform communication with the log source to receive a log stream.

A log stream may include a log, or logs, that are generated, communicated, or accessed in real-time or near real time. For example, the log stream may include logs that are communicated via one or more communication channels immediately after generation. In some examples, the log stream include, or be associated, an identifier that associates the log stream with the communication source and/or a time window that that establishes the real-time status of the log stream. For example, the log stream may include logs that are generated, communicated, and/or received within a time threshold less than an hour, such as in a range of seconds or minutes.

In some examples, the log projection session 204 may receive multiple log streams. Each of the log streams may be associated with a different log source. In other words, the log streams received by the streaming session may be generated by separate corresponding log sources.

The log projection session 204 may generate a log projection stream (310). The log projection stream may include a log predicted (i.e. inferred or forecasted) to occur at a future date. For example, logs from the log stream and the machine-learning model may be supplied as input parameters to a log projection logic 206. The log projection logic 206 may access a machine-learning framework. The machine-learning framework may include a framework that generated the machine-learning model and/or is capable of clustering, inferring, and/or classing information based on a machine-learning model. Alternatively or in addition, the machine-learning model may include logic that evaluates the log information to generate the predicted log.

The log projection logic 206 may generate a log projection. The log projection may include, for example, information that describes forecasted computer resource behavior. For example, the log projection may include forecasted computer resource activity, forecasted faults, forecasted metrics, and/or any other forecasted information related to computer resource operation. Alternatively or in addition, the log projection may include one or more forecasted utilization metrics. The forecasted utilization metrics may include forecasted measurements of computer resource utilization (e.g. CPU utilization, memory utilization, number of threads, number of processes, latency, bandwidth, or other metrics that measure computer resource utilization).

In some examples, the log projection may include a forecasted job failure. A forecasted job failure may include, for example, a state in which a job is not operating according to an acceptance criteria. For example, the log projection may include information indicative of a job allocating more computer resources, such as memory, than assigned. In other examples, the log projection may include a forecasted log message indicative of an error, warning, fault, or other adverse operation (or lack of operation).

In some examples, the launcher 202 may receive update parameters for a session profile. The update parameter may include, for example, one or more model identifiers, updated flag information, and/or one or more log source identifiers. The update parameter for the session profile may be communicated from a user interface and/or determined automatically.

The launcher 202 may determine whether the session profile has been calibrated (312). For example, the launcher 202 may determine whether one or more parameter of the session profile has been updated. For example, the launcher 202 may determine one or more log source identifiers have been added, remove, modified, and/or deleted. Alternatively or in addition, the launcher 202 may determine one or more model identifiers have been added, removed, modified, or deleted, unflagged, and/or reflagged.

In response to determining the session profile has been calibrated (312, YES), the launcher 202 may redeploy the log projection session 204 (314). Redeployment may include updating the operation of the session profile. For example, redeployment of the log projection session 204 may include causing the log projection session 204 to apply log stream(s) to an alternative machine-learning model. In other examples, redeployment of the log projection session 204 may include causing the log projection session 204 to receive log stream(s) from additional or alternative log source(s). In response to determining the session profile has not been calibrated (312, No), the log projection session 204 may resume deployment unmodified.

In some examples, calibrating the session profile may include flagging an alternative machine-learning model as the preferred machine-learning model. The launcher 202 may extract the alternative model identifier. For example, the launcher 202 may extract the alternative machine-learning profile identifier in response to the alternative machine-learning model being flagged for deployment in the session profile. Alternately or in addition, the model identifiers of the session profile may be prioritized. The launcher 202 may select the machine-learning profile with the highest priority (or lowest priority depending on the direction of performance). Launcher may reconfigure the log projection session 204 with the alternative machine-learning model corresponding to the alternative identifier. In other examples, the launcher 202 may deploy a new log projection session 204 in replace of the previous log projection session 204.

The log projection session 204 may receive a log stream from the log source(s) (318). For example, the alternative machine-learning model may be mapped to a different log source or log source(s). The launcher 202 and/or the log projection session 204 may terminate communication with previous log source and/or establish communication with new log sources that are associated with the alternative machine-learning model in the session profile.

The log projection session 204 may generate the log projection stream (320). In response to determining the alternative machine-learning model is preferred, the log projection session 204 may be redeployed to generate the log projection stream based on the alternative machine-learning model instead of the initial log projection model. After the log projection session is redeployed based on the calibrated session profile, the log projection stream may include projected logs determined based on the alternative machine-learning model and/or at least one new log stream received by the log projection session 204. In response to determining that the initial model is still the flagged, the log projection stream may continue to generate log projections based on the initial machine-learning model.

Figure 4:
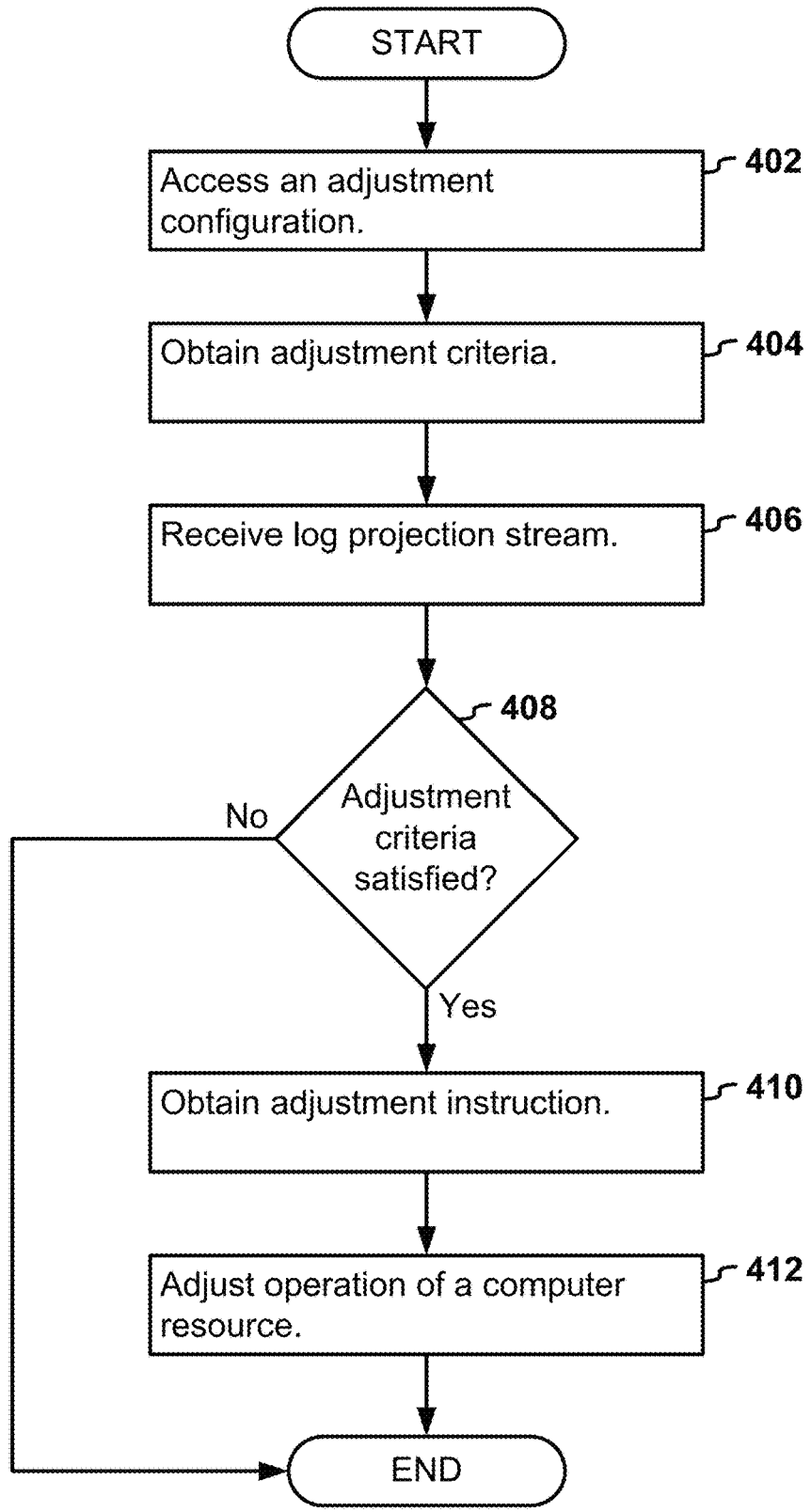
FIG. 4 illustrates an example of a flow diagram for logic for a resource adjustment engine.

FIG. 4 illustrates an example of a flow diagram for logic for the resource adjustment engine 106. The resource adjustment engine 106 may receive an adjustment configuration (402). In some examples, the adjustment configuration may be extracted from a session profile. The resource adjustment engine 106 may obtain adjustment criteria (404). In some examples, the adjustment criteria may be extracted from the adjustment configuration. Examples of the adjustment configuration, adjustment criteria, and/or the session profile are described in the discussion referring to FIG. 1.

The resource adjustment engine 106 may receive a log projection stream (406). In some examples, the resource adjustment engine 106 may receive multiple log projection streams. The log projection stream that are relevant to the adjustment criteria may be identified by the adjustment configuration. The resource adjustment engine 106 may receive the log projection stream in response to the log projection stream being identified in one or more adjustment configurations received by the resource adjustment engine 106. Alternatively or in addition, the adjustment configuration may include an identifier of a log projection session 204. The adjustment configuration may communicate with the log projection session 204 to receive a log projection stream. In other examples, the log projection stream may be stored in a database and associated with the log projection session 204 that generated the log projection stream.

The resource adjustment engine 106 may determine whether the adjustment criteria is satisfied (408). Satisfaction of the adjustment criteria may include determining one or more logical conditions are met. The logical conditions may reference one or more log source identifier, or variable representative of log information. The resource adjustment engine 106 may apply one or more log projection from the log projection stream to the adjustment criteria to determine if the conditions of the adjustment criteria are met. The conditions may include predefined thresholds, logical statements, and/other predetermine information that may be compared with or applied to one or more log projection.

In response to the adjustment criteria being satisfied (408, Yes), the resource adjustment engine 106 may obtain an adjustment instruction (410). In some examples, the adjustment instruction may be mapped to the adjustment criteria in the adjustment configuration. For example, the resource adjustment engine 106, in response to receipt of an adjustment configuration, may establish a mapping between the scaling instruction and the adjustment criteria specified in the adjustment configuration. In other examples, the adjustment instruction may be included in the adjustment criteria.

The resource adjustment engine 106 may adjust operation of a computer resource based on the adjust instruction. For example, the resource adjustment engine 106 may communicate the adjustment instruction to the computer resource. The adjustment instruction may cause the computer resource to adjust operation. For example, the adjustment instructing may cause the resource adjust engine to reallocate computer resources and/or allocate new computer resources. Examples of adjusting operation of a computer resource are described in reference to FIG. 1.

Figure 5:
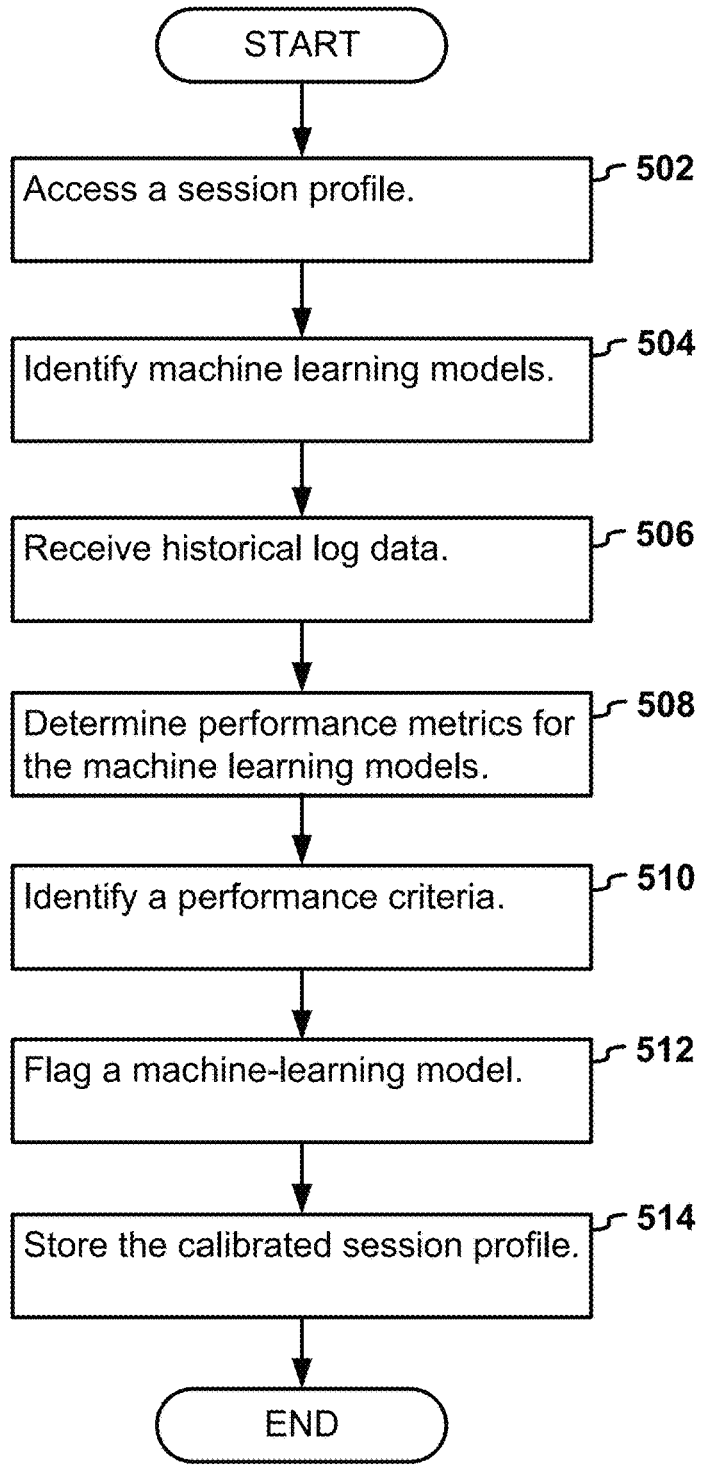
FIG. 5 illustrates an example of a flow diagram for logic of a calibration controller.

FIG. 5 illustrates an example of a flow diagram for logic of the calibration controller 108. The calibration controller 108 may access a session profile (502). For example, the calibration controller 108 may receive a session profile and/or access a session profile from the profile repository 116. The calibration controller 108 may identify one or more model identifier included in the session profile (504). For example, the calibration controller 108 may extract one or more model identifier included in the session profile.

The calibration controller 108 may receive historical log data (506). For example, the calibration controller 108 may receive the historical log data from the log repository 114. In some examples, the session profile may include one more log source identifiers. The historical log data may be associated with the log source identifier(s) in the log repository 114. Accordingly, the calibration controller 108 my select the historical log data in response to the historical log data being associated with the log sources specified in the session profile.

The calibration controller 108 may generate performance metrics for the machine-learning models (508). For example, a machine-learning framework may receive the machine-learning model and log(s) as input parameters. The logs may be extracted from the historical log data. The machine-learning framework may include logic to generate a performance metric for the machine-learning model. The performance metric may include a measurement of the quality of a prediction made based on the machine-learning model. In various examples, the performance metric may include, for example, Mean Absolute Percentage Error (MAPE) to determine the accuracy of the model or some other metric indicative of predictive performance or model accuracy.

The calibration controller may identify a performance criteria (510). The performance criteria may include one or more predetermined values and/or conditional logic. The performance criteria may include logic to compare a performance metric to a predetermined value. For example, the performance criteria may include an instruction to select the highest performance metric (or lowest performance metric depending on the performance ranking). Alternately or in addition, the performance criteria may include logic to determine whether a performance metric is greater than or less than a predetermined threshold (or within a predetermined range). In some examples, the performance criteria may be included in the session profile. Alternatively or in addition, the performance criteria may be input via a graphical user interface, application-programming interface, or some other interface.

The calibration controller 108 may flag at least one of the machine-learning models in the session profile (512). For example, the calibration controller 108 may flag the model identifier in response to a performance metric associated with the model identifier satisfying the performance criteria. Satisfaction of the performance criteria may be satisfied when a performance metric meets one or more condition of the performance criteria. For example, satisfaction of the performance criteria may include a performance metric being higher, lower, and/or within a range of a predefined threshold.

The calibration controller 108 may modify the session profile to re-associate a flag value from an initial model identifier to an alternative model identifier. Alternately or in addition, the calibration controller 108 may prioritize the machine-learning models identified in the session profile. The prioritization may be based on the performance metrics corresponding to the machine-learning models. The session profile, after it is updated by the calibration controller 108, may be referred to as a calibrated session profile.

The calibration controller 108 may store the calibrated session profile (514). For example, the calibration controller 108 may store the calibrated session profile in the profile repository 116. Alternatively or in addition, the calibration controller 108 may share the calibrated session profile with the log projection controller 104.

Figure 6:
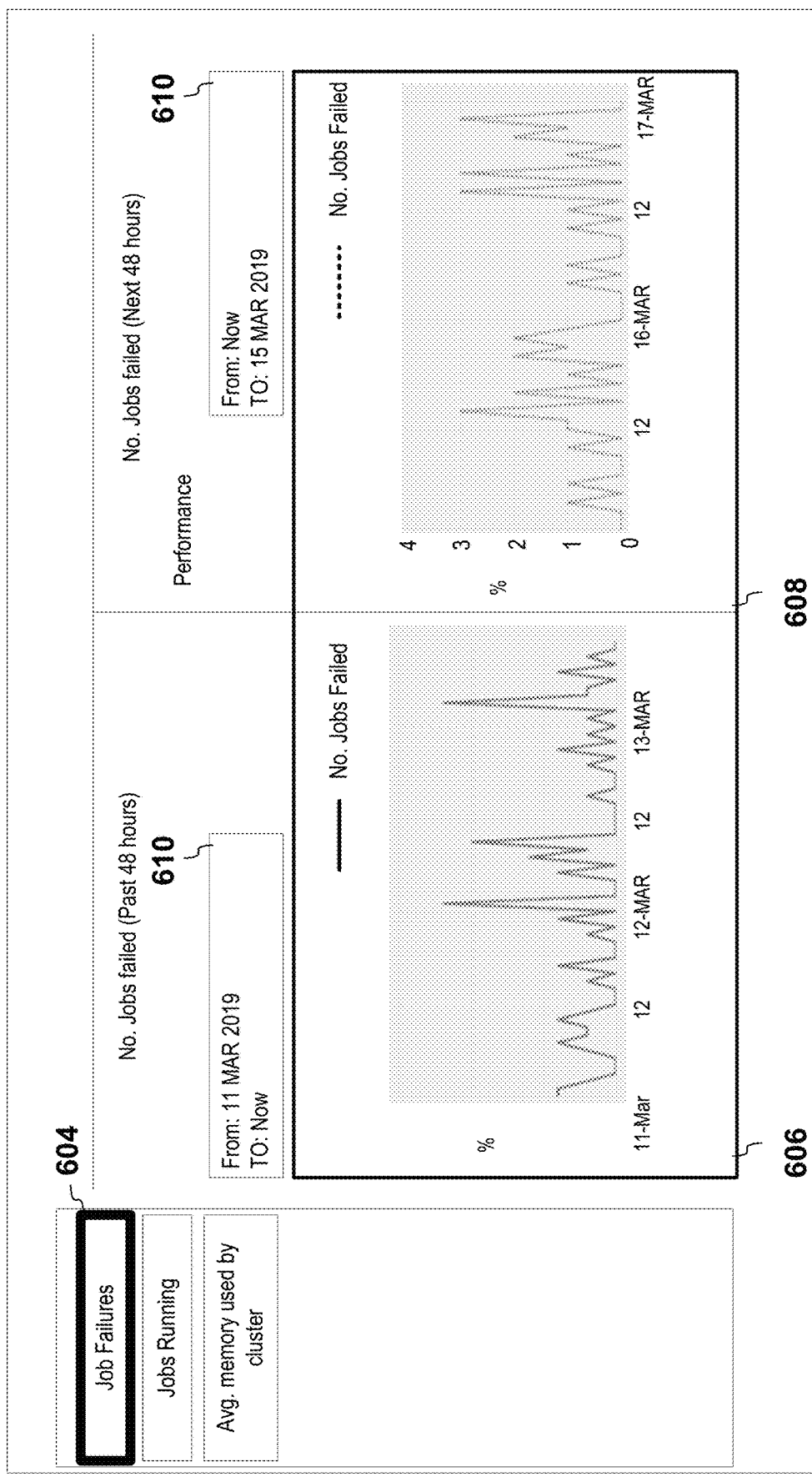
FIG. 6 illustrates an example of an interactive view for a graphical user interface.

FIG. 6 illustrates an example of an interactive view 602 for a graphical user interface. The interactive view 602 may include a one or more profile control 604. The profile control 604 may represent a session profile. The profile control 604 may be selectable. Selection of the profile control 604 may cause information received and/or generated by a log projections session to be displayed in the interactive view 602.

The interactive view 602 may include a log stream control 606. The log stream control 606 may include a graph, or other visual graphic, for a log stream. As the log projection session 204 (see FIG. 2) receives new log stream data, the log stream control 606 may be updated. The log stream control 606 illustrated in FIG. 6 shows number of jobs failed as the log data that is visually graphed. In other examples, other types log data may be displayed by the log stream control 606.

Alternately or in addition, the interactive view 602 may display a log projection stream control 608. The log projection stream control 608 may include a graph, or some other visual graphic for a log projection stream. As the log projection session 204 (see FIG. 2) generates a log projection stream, the log projection stream control may be updated. In some examples, the log stream control 606 and/or the log projection stream control 608 may be displayed adjacent to each other, such as side-by-side, so that a log stream and a log projection stream may be compared. The log projection stream control 608 illustrated in FIG. 6 shows a forecasted number of jobs failed as the log projection data that is visually graphed. In other examples, other types log projection data may be displayed by the log projection stream control 608.

In some examples, the interactive view may include a time selection control 610. The time selection control 610 may establish a time window in which data for the log stream control 606 and/or log stream projection control 608 may be displayed. For example, the time selection control 610 may include an upper time bound and/or a lower time bound. A portion of the log stream, or log prediction stream, corresponding to the upper and lower bound may be displayed. In some examples, the upper tome bound and/or lower time bound may be a present time, and the interactive view may be periodically be refreshed to show the latest log stream data and/or the lasted log projection stream data. The time selection control 610 may be modified. The data visualized in the log stream control 606 and/or the log projection control 608 may be modified in response to adjustment of the time selection control.

Figure 7:
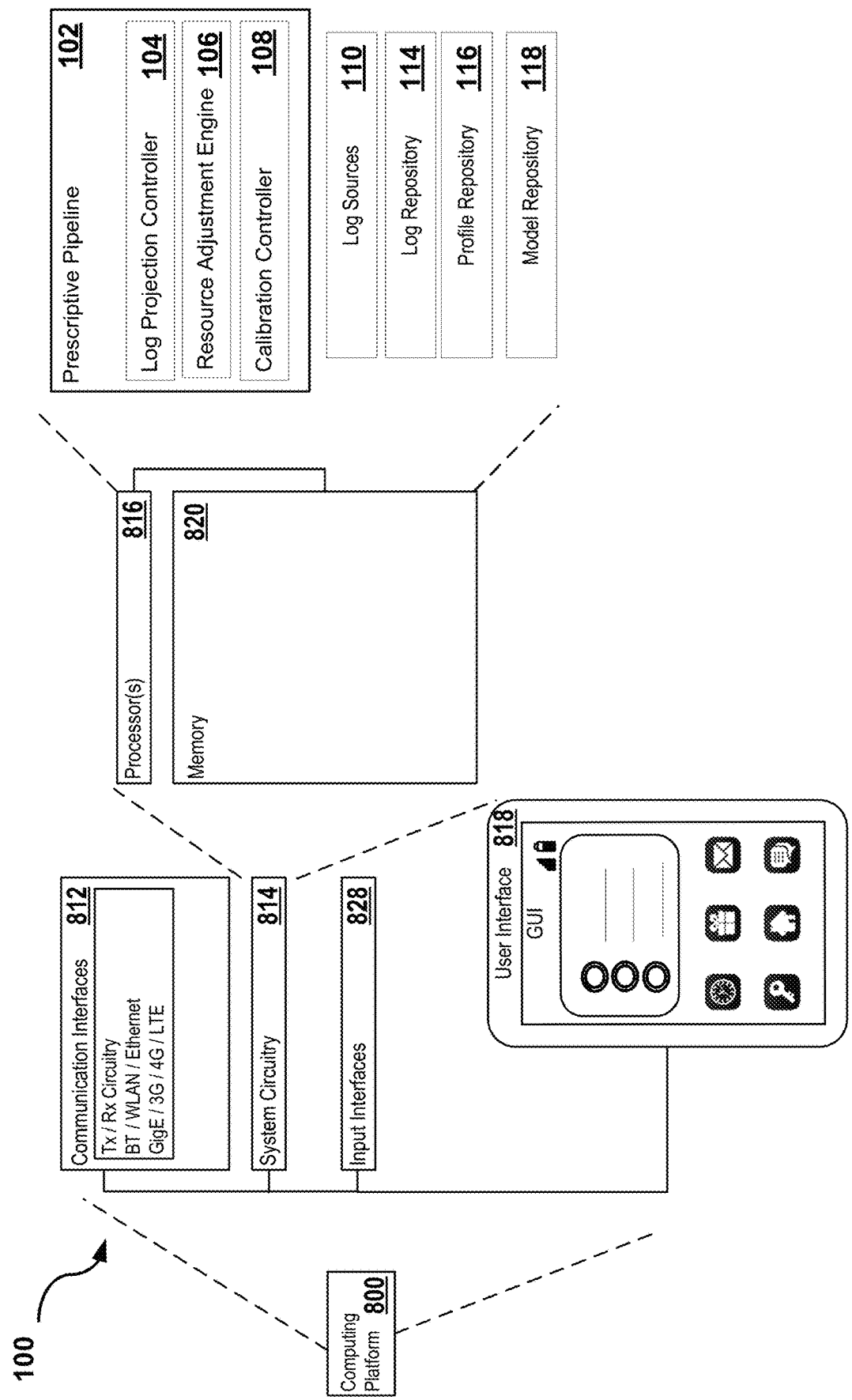
FIG. 7 illustrates a second example of a system.

FIG. 7 illustrates a second example of the system 100. The system 100 may a computing platform 800. The computing platform 800 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations the prescriptive pipeline, the log projection controller 104, the resource adjustment engine 106, the calibration controller 108, the log sources 110, the log repository 114, the profile repository 116, the model repository 118 and/or the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the operations the log projection controller 104, the resource adjustment engine 106, the calibration controller 108, the log sources 110, the log repository 114, the profile repository 116, the model repository 118 and/or the system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include the log projection controller 104, the resource adjustment engine 106, the calibration controller 108, the log sources 110, the log repository 114, the profile repository 116, the model repository 118, the system 100, and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

In various implementations, the computing platform, or portions thereof, may include, or be included in, a server or one or more servers. The server may be a virtual server, a physical server, or any combination thereof. The server may be hosted on-premises and/or by a cloud provider.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects.

A first aspect may include a method comprising: accessing a session profile, the session profile comprising log source identifiers and model identifiers, the model identifiers identifying respective machine-learning models, each of the model identifiers comprising an initial model identifier, the initial model identifier being flagged; deploying a log projection session in a memory for execution on a computing platform based on the session profile by: extracting the log source identifiers with a flagged initial model identifier from the session profile; receiving a log stream from a log source corresponding to at least one of the extracted log identifiers; and generating a log projection stream based on the log stream and an initial machine-learning model corresponding to the flagged initial model identifier; calibrating the session profile by: generating, based on application of historical log data to the machine-learning models, respective performance metrics for the machine-learning models; identifying a performance criteria for the machine leaning models; and flagging an alternative model identifier included in the session profile as being active in response to the alternative model identifier being associated with a performance metric that satisfies a performance criteria, the alternative model identifier associated with an alternative machine-learning model; and redeploying the log projection session in the memory of the computing platform based on the calibrated session profile by generating the log projection stream by application of the log stream to the alternative machine-learning model instead of the initial machine-learning model.

A second aspect may include the method of aspect one, wherein the log stream comprises log information generated in real time from at least one of the log sources and the log projection stream comprises log information predicted to occur at a time after receipt of the log stream.

A third aspect may include the method of aspects one to two, wherein redeploying the log projection session based on the calibrated session profile further comprises: extracting, from the session profile, the alternative model identifier in response to the alternative model identifier being flagged.

A fourth aspect may include the method of any of aspects one to three, further comprising: receiving an update parameter for the session profile, the update parameter comprising a new log source identifier; including the new log source identifier in the session profile, wherein calibrating the session profile further comprises: identifying historical log data in a log repository in response to the historical log data being associated with the new log source identifier; wherein redeploying the log projection session based on calibrated session profile further comprises: receiving a new log data stream from a new log source corresponding to the new log source identifier; and generating the log projection stream based on the new log data stream and the alternative machine-learning model.

A fifth aspect may include the method of any of aspects one to four, wherein calibrating the session profile further comprises: dynamically calibrating the session profile concurrent with generating the log projection stream.

A sixth aspect may include the method of aspects one to five, wherein session profile comprises an adjustment criteria and an adjustment instruction, the method further comprising: determining information included in the log projection stream satisfies the adjustment criteria; and transmitting, in response to the adjustment criteria being satisfied, the adjustment instruction to a computer resource to adjust operation of the computer resource.

A seventh aspect may include the method of aspect six, wherein the adjustment instructions comprises an instruction to reallocate an amount of a computer resource available for a virtual machine, an operating system, an application, a task, or any combination thereof.

An eighth aspect may include the method of aspect six further comprising: receiving an update parameter for the session profile, the update parameter comprising the adjustment criteria, the adjustment instruction, or any combination thereof; and including the update parameter in the session profile.

A ninth aspect may include a system comprising: a processor, the processor configured to: access a session profile, the session profile comprising log source identifiers and model identifiers, the model identifiers indicative of machine-learning models, the model identifiers comprising an initial model identifier, the initial model identifier being flagged; deploy a log projection session based on the session profile; receive, in response to deployment of the log projection session, a log stream from a log source corresponding to at least one of the log source identifiers; generate a log projection stream based on the log stream and an initial machine-learning model corresponding to the flagged initial model identifier; calibrate the session profile, wherein calibration of the session profile comprises the processor being further configured to: generate, based on application of historical log data to the machine-learning models, respective performance metrics for the machine-learning models; and identify a performance criteria for the machine-learning models; and flag an alternative model identifier included in the session profile as being active in response to the alternative model identifier being associated with a performance metric that satisfies a performance criteria, the alternative model identifier associated with an alternative machine-learning model; and redeploy the log projection session based on the calibrated session profile; and in response to redeployment of the session profile, generate the log projection stream based on application of the log stream to the alternative machine-learning model instead of the initial machine-learning model.

A tenth aspect may include the system of aspect nine, wherein the log stream comprises log information generated in real time from at least one of the log sources and the log projection stream comprises log information predicted to occur at a time after receipt of the log stream.

An eleventh aspect may include the system of aspect nine through ten, wherein the processor is further configured to: extract, from the session profile, the alternative model identifier in response to the alternative model identifier being flagged.

A twelfth aspect may include the system of any of aspects nine through eleven, wherein the processor is further configured to: receive an update parameter for the session profile, the update parameter comprising a new log source identifier; include the new log source identifier in the session profile; identify historical log data in a log repository in response to the historical log data being associated with the new log source identifier; receive a new log data stream from a new log source corresponding to the new log source identifier; and generate the log projection stream based on the new log data stream and the alternative machine-learning model.

A thirteenth aspect may include may include the system of any of aspects nine through twelve, wherein session profile comprises an adjustment criteria and an adjustment instruction, wherein the processor is further configured to: determine information included in the log projection stream satisfies the adjustment criteria; and transmit, in response to the adjustment criteria being satisfied, the adjustment instruction to a computer resource to adjust operation of the computer resource.

A fourteenth aspect may include the system of aspect thirteen, wherein the adjustment instructions comprises an instruction to reallocate an amount of a computer resource available for a virtual machine, an operating system, an application, a task, or any combination thereof.

A fifteenth aspect may include the system of aspect thirteen, wherein the processor is further configured to: receive an update parameter for the session profile, the update parameter comprising the adjustment criteria, the adjustment instruction, or any combination thereof; and include the update parameter in the session profile.

A sixteenth aspect may include a non-transitory computer readable storage medium comprising: a plurality of instructions executable by a processor, the instructions comprising: instructions executable by the processor to access a session profile, the session profile comprising log source identifiers and model identifiers, the model identifiers indicative of machine-learning models, the model identifiers comprising an initial model identifier, the initial model identifier being flagged; instructions executable by the processor to deploy a log projection session based on the session profile; instructions executable by the processor to receive, in response to deployment of the log projection session, a log stream from a log source corresponding to at least one of the log source identifiers; instructions executable by the processor to generate a log projection stream based on the log stream and an initial machine-learning model corresponding to initial model identifier; instructions executable by the processor to calibrate the session profile, wherein instructions executable by the processor to calibrate the session profile further comprise: instructions executable by the processor to generate, based on application of historical log data to the machine-learning models, respective performance metrics for the machine-learning models; instructions executable by the professor to identify a performance criteria; and instructions executable by the processor to flag an alternative model identifier included in the session profile as being active in response to the alternative model identifier being associated with a performance metric that satisfies a performance criteria, the alternative model identifier associated with an alternative machine-learning model; instructions executable by the processor to redeploy the log projection session based on the calibrated session profile; and instructions executable by the processor to generate, in response to redeployment of the session profile, the log projection stream based on application of the log stream to the alternative machine-learning model instead of the initial machine-learning model.

A seventeenth aspect may include the non-transitory computer readable storage medium sixteen, wherein the log stream comprises log information generated in real time from at least one of the log sources and the log projection stream comprises log information predicted to occur at a time after receipt of the log stream.

An eighteenth aspect may include the non-transitory computer readable storage medium of any of aspects sixteen through seventeen, further comprising instructions executable by the processor to: instructions executable by the processor to extract, from the session profile, the alternative model identifier in response to the alternative model identifier being flagged.

A nineteenth aspect may include the non-transitory computer readable storage medium of any of aspects sixteen through eighteen, wherein session profile comprises an adjustment criteria and an adjustment instruction, wherein the non-transitory computer readable storage medium further comprises: instructions executable by the processor to determine information included in the log projection stream satisfies the adjustment criteria; and instructions executable by the processor to transmit, in response to the adjustment criteria being satisfied, the adjustment instruction to a computer resource to adjust operation of the computer resource.

A twentieth aspect may include the non-transitory computer readable storage medium of aspect nineteen, wherein the adjustment instructions comprises an instruction to reallocate an amount of a computer resource available for a virtual machine, an operating system, an application, a task, or any combination thereof.

What is claimed is:

1. A method comprising:
accessing a session profile stored in memory in a profile repository, the stored session profile comprising log source identifiers mapped to respective model identifiers, each of the model identifiers identifying respective machine-learning models and the log source identifiers identifying input parameters for use by the respective machine-learning models, the model identifiers comprising an initial model identifier, the initial model identifier being flagged as active;
deploying a log projection session in a memory for execution on a computing platform based on the session profile by:
extracting the log source identifiers with a flagged initial model identifier from the session profile;
receiving, as input parameters for the flagged initial model identifier, a log stream from a log source corresponding to at least one of the extracted log source identifiers; and
generating a log projection stream, based on the input parameters of the log stream, with an initial machine-learning model corresponding to the flagged initial model identifier;
calibrating the session profile by:
  generating, based on application of historical log data to the machine-learning models, respective performance metrics for the machine-learning models;
  identifying a performance criteria for the machine learning models; and
  flagging an alternative model identifier included in the session profile as being active in response to the alternative model identifier being associated with a performance metric that satisfies the performance criteria, the alternative model identifier associated, in the session profile, with an alternative machine-learning model and mapped to a respective log source identifier identifying an alternative log source and a corresponding alternative input parameter for use by the respective alternative machine-learning model, wherein flagging the alternative model identifier comprises:
    testing predictive performance of the machine-learning models, and
    reprioritizing and reflagging the machine-learning models in response to
  changing performance of the machine-learning models;
storing the calibrated session profile in the profile repository; and
redeploying the log projection session in the memory of the computing platform based on the stored calibrated session profile by generating the log projection stream by application of an alternative log stream to the alternative machine-learning model instead of application of the log stream to the initial machine-learning model, the alternative log stream from the alternative log source corresponding to the respective log source identifier identifying the corresponding alternative input parameter.

2. The method of claim 1, wherein the log stream comprises log information generated in real time from at least one of the log sources and the log projection stream comprises log information predicted to occur at a time after receipt of the log stream.

3. The method of claim 1, wherein redeploying the log projection session based on the calibrated session profile further comprises: extracting, from the session profile, the alternative model identifier in response to the alternative model identifier being flagged.

4. The method of claim 1, further comprising:
  receiving an update parameter for the session profile, the update parameter comprising a new log source identifier;
  including the new log source identifier in the session profile,
wherein calibrating the session profile further comprises:
  identifying historical log data in a log repository in response to the historical log data being associated with the new log source identifier;
wherein redeploying the log projection session based on calibrated session profile further comprises:
  receiving a new log data stream from a new log source corresponding to the new log source identifier; and
  generating the log projection stream based on the new log data stream and the alternative machine-learning model.

5. The method of claim 1, wherein calibrating the session profile further comprises:
  dynamically calibrating the session profile concurrent with generating the log projection stream.

6. The method of claim 1, wherein session profile comprises an adjustment criteria and an adjustment instruction, the method further comprising:
  determining information included in the log projection stream satisfies the adjustment criteria;
  accessing the session profile to obtain the adjustment instruction; and
  transmitting, in response to the adjustment criteria being satisfied, the adjustment instruction to a computer resource to adjust operation of the computer resource by at least one of reallocating computer resources, allocating new computer resources, or changing operation of computer resources.

7. The method of claim 6, wherein the adjustment instructions comprises an instruction to reallocate an amount of a computer resource available for a virtual machine, an operating system, an application, a task, or any combination thereof.

8. The method of claim 6, further comprising:
  receiving an update parameter for the session profile, the update parameter comprising the adjustment criteria, the adjustment instruction, or any combination thereof; and
  including the update parameter in the session profile.

9. The method of claim 1, wherein identifying a performance criteria for the machine learning models comprises identifying one of a change in log source availability or a change in a computer resource operation executing the initial machine learning model.

10. The method of claim 1, wherein redeploying the log projection session in the memory of the computing platform comprises terminating communication with the log source and establishing communication with the alternative log source.

11. A system comprising:
a memory;
a processor, the processor configured to:
access a session profile stored in a profile repository in the memory, the session profile comprising log source identifiers mapped to model identifiers, the model identifiers indicative of machine-learning models and the log source identifiers identifying input parameters for use by the respective machine-learning models, the model identifiers comprising an initial model identifier, the initial model identifier being flagged;
deploy a log projection session based on the session profile;
receive, as input parameters, in response to deployment of the log projection session, a log stream from a log source corresponding to at least one of the log source identifiers;
generate a log projection stream based on the log stream and an initial machine-learning model corresponding to the flagged initial model identifier;
calibrate the session profile, wherein calibration of the session profile comprises the processor being further configured to:
  generate, based on application of historical log data to the machine-learning models, respective performance metrics for the machine-learning models;
  identify a performance criteria for the machine-learning models;

test predictive performance of the machine-learning models;

reprioritize and reflag the machine-learning models in response to changing performance of the machine-learning models; and flag an alternative model identifier included in the session profile as being active in response to the alternative model identifier being associated with a performance metric that satisfies a performance criteria, the alternative model identifier associated with an alternative machine-learning model and mapped to a respective log source identifier identifying an alternative input parameter for use by the respective alternative machine-learning model;

store the calibrated session profile in the profile repository;

redeploy the log projection session based on the stored calibrated session profile; and in response to redeployment of the session profile, generate the log projection stream based on application of the log stream to the alternative machine-learning model instead of the initial machine-learning model, the log stream from the log source corresponding to the respective log source identifier identifying the alternative input parameter.

12. The system of claim 11, wherein the log stream comprises log information generated in real time from at least one of the log sources and the log projection stream comprises log information predicted to occur at a time after receipt of the log stream.

13. The system of claim 11, wherein the processor is further configured to:

extract, from the session profile, the alternative model identifier in response to the alternative model identifier being flagged.

14. The system of claim 11, wherein the processor is further configured to:

receive an update parameter for the session profile, the update parameter comprising a new log source identifier;

include the new log source identifier in the session profile;

identify historical log data in a log repository in response to the historical log data being associated with the new log source identifier;

receive a new log data stream from a new log source corresponding to the new log source identifier; and generate the log projection stream based on the new log data stream and the alternative machine-learning model.

15. The system of claim 11, wherein session profile comprises an adjustment criteria and an adjustment instruction, wherein the processor is further configured to:

determine information included in the log projection stream satisfies the adjustment criteria; and transmit, in response to the adjustment criteria being satisfied, the adjustment instruction to a computer resource to adjust operation of the computer resource.

16. The system of claim 15, wherein the adjustment instructions comprises an instruction to reallocate an amount of a computer resource available for a virtual machine, an operating system, an application, a task, or any combination thereof.

17. The system of claim 15, wherein the processor is further configured to:

receive an update parameter for the session profile, the update parameter comprising the adjustment criteria, the adjustment instruction, or any combination thereof; and include the update parameter in the session profile.

18. A non-transitory computer readable storage medium comprising:

a plurality of instructions executable by a processor, the instructions comprising:

instructions executable by the processor to access a session profile stored in a profile repository in the computer readable storage medium, the session profile comprising log source identifiers mapped to model identifiers, the model identifiers indicative of machine-learning models and the log source identifiers identifying input parameters for use by the respective machine-learning models, the model identifiers comprising an initial model identifier, the initial model identifier being flagged;

instructions executable by the processor to deploy a log projection session based on the session profile;

instructions executable by the processor to receive, as input parameters, in response to deployment of the log projection session, a log stream from a log source corresponding to at least one of the log source identifiers;

instructions executable by the processor to generate a log projection stream based on the log stream and an initial machine-learning model corresponding to initial model identifier;

instructions executable by the processor to calibrate the session profile, wherein instructions executable by the processor to calibrate the session profile further comprise:

instructions executable by the processor to generate, based on application of historical log data to the machine-learning models, respective performance metrics for the machine-learning models;

instructions executable by the professor to identify a performance criteria;

instructions executable by the processor to test predictive performance of the machine-learning models;

instructions executable by the processor to reprioritize and reflag the machine-learning models in response to changing performance of the machine-learning models; and instructions executable by the processor to flag an alternative model identifier included in the session profile as being active in response to the alternative model identifier being associated with a performance metric that satisfies a performance criteria, the alternative model identifier associated with an alternative machine-learning model and mapped to a respective log source identifier identifying an alternative input parameter for use by the respective alternative machine-learning model;

instructions executable to store the calibrated session profile in the profile repository;

instructions executable by the processor to redeploy the log projection session based on the calibrated session profile; and instructions executable by the processor to generate, in response to redeployment of the session profile, the log projection stream based on application of the log stream to the alternative machine-learning model instead of the initial machine-learning model, the log stream from the log source corresponding to the respective log source identifier identifying the alternative input parameter.

19. The non-transitory computer readable storage medium of claim 18, wherein the log stream comprises log information generated in real time from at least one of the log sources and the log projection stream comprises log information predicted to occur at a time after receipt of the log stream.

20. The non-transitory computer readable storage medium of claim 18, further comprising instructions executable by the processor to: instructions executable by the processor to extract, from the session profile, the alternative model identifier in response to the alternative model identifier being flagged.

21. The non-transitory computer readable storage medium of claim 18, wherein session profile comprises an adjustment criteria and an adjustment instruction, wherein the non-transitory computer readable storage medium further comprises:

instructions executable by the processor to determine information included in the log projection stream satisfies the adjustment criteria; and instructions executable by the processor to transmit, in response to the adjustment criteria being satisfied, the adjustment instruction to a computer resource to adjust operation of the computer resource.

22. The non-transitory computer readable storage medium of claim 21, wherein the adjustment instructions comprises an instruction to reallocate an amount of a computer resource available for a virtual machine, an operating system, an application, a task, or any combination thereof.

* * * * *

UNITED STATES PATENT AND TRADEMARK OFFICE
CERTIFICATE OF CORRECTION

PATENT NO.        : 10,713,143 B1
APPLICATION NO.   : 16/449644
DATED             : July 14, 2020
INVENTOR(S)       : Jayanti Vemulapati et al.

It is certified that error appears in the above-identified patent and that said Letters Patent is hereby corrected as shown below:

In the Specification

Columns 4 and 5, after title "TABLE 1", approximately Line 27, delete the entire "Table 1" and replace with the following Table 1:

--Table 1 - Session Profile

| Operational Scenario | Predict and remedy high CPU usages leading to job slowness. | | | | |
|---|---|---|---|---|---|
| Log Source Identifiers | Resource metrics (CLOUD WATCH) | Resource metrics (SAR) | Resource metrics (NAGIOS) | Job metrics (HDP) | Job metrics (TALEND) |
| | Avg_CPU | %iowait | UPTIME-PERCENT | No. of jobs failed | TACUptime |
| | Avg_DiskUtil | %mem | CPU-AVERAGE | No. of jobs running | TACService Uptime |
| | Avg_Network In_bytes | pgfree/s | MEM-AVERAGE | Avg. memory used by the cluster | Jobsfailedto-generate |
| | Avg_Network Out_bytes | pgpgin/s | ROOTDISK-AVERAGE | Memory allocated by Yarn | jobserver service |
| | | pgpgout/s | SUPDISK-AVERAGE | No. of failed jobs in application server | numberof failedjobs |

Signed and Sealed this
Sixth Day of October, 2020

Andrei Iancu
*Director of the United States Patent and Trademark Office*

| Machine Learning Model | Log Source Identifiers | Log Source | ML Model | FLAG |
|---|---|---|---|---|
| | CPU Utilization | Cloudwatch | ARIMA | 1 |
| | Memory Utilization | SAR | ARIMA | 0 |
| | Disk Utilization | System Command | ARIMA | 0 |
| | Network In | Cloudwatch | ARIMA | 0 |
| | Network Out | Cloudwatch | ARIMA | 0 |
| | Disk Capacity Predicted Date | System Command | LINEAR REGRESSION | 0 |
| | HDP: jobs failed | YARN | ARIMA | 0 |
| | HDP: jobs running | YARN | ARIMA | 0 |
| | HDP: Avg. memory used by the cluster | YARN | LINEAR REGRESSION | 0 |
| | HDP: Memory allocated by Yarn | YARN | LINEAR REGRESSION | 0 |
| | Talend: jobs failed jobs | Talend: JobServer | ARIMA | 0 |

Table 1

| Adjustment Configuration | |
|---|---|
| | If (Predicted CPU Usage > 75 %)<br>{<br>    Re-provision Virtual Host A with 1 additional processor.<br>{<br>If(Predicted CPU Usage > 90 %)<br>{<br>    Re-provision Virtual Host A with 2 additional processors.<br>} |